United States Patent
Aikens et al.

(10) Patent No.: US 7,870,243 B1
(45) Date of Patent: Jan. 11, 2011

(54) METHOD, SYSTEM AND PROGRAM PRODUCT FOR MANAGING NETWORK PERFORMANCE

(75) Inventors: Glenn Clement Aikens, Apex, NC (US); Siu Hung Choy, Durham, NC (US); Shawn Allen Clymer, Raleigh, NC (US); Douglas Ronald Duer, Pittsboro, NC (US); Richard Arthur Franck, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,273

(22) Filed: Apr. 11, 2000

(51) Int. Cl.
*G06F 15/173* (2006.01)
(52) U.S. Cl. ..................... 709/224
(58) Field of Classification Search ......... 709/223–224; 702/186–188; 379/265.02; 700/32–33
See application file for complete search history.

(56) References Cited

U.S. PATENT DOCUMENTS

| | | | |
|---|---|---|---|
| 5,469,148 A * | 11/1995 | Baumann et al. | 340/658 |
| 5,615,323 A * | 3/1997 | Engel et al. | 345/440 |
| 5,751,964 A | 5/1998 | Ordanic et al. | 395/200.54 |
| 5,758,258 A | 5/1998 | Shoff et al. | 455/5.1 |
| 5,835,897 A | 11/1998 | Dang | 705/2 |
| 5,864,483 A * | 1/1999 | Brichta | 364/468.16 |
| 5,867,495 A | 2/1999 | Elliott et al. | 370/352 |
| 5,884,037 A * | 3/1999 | Aras et al. | 709/223 |
| 5,893,069 A | 4/1999 | White, Jr. | 705/1 |
| 5,897,624 A | 4/1999 | Ramaswamy | 705/28 |
| 5,946,662 A | 8/1999 | Ettl et al. | 705/8 |
| 6,003,079 A | 12/1999 | Friedrich et al. | 709/224 |
| 6,125,105 A * | 9/2000 | Edwards et al. | 370/230 |
| 6,272,110 B1 * | 8/2001 | Tunnicliffe et al. | 370/232 |
| 6,311,175 B1 * | 10/2001 | Adriaans et al. | 706/25 |
| 6,320,585 B1 * | 11/2001 | Engel et al. | 345/440 |
| 6,557,035 B1 * | 4/2003 | McKnight | 709/224 |
| 6,836,800 B1 * | 12/2004 | Sweet et al. | 709/224 |
| 6,912,575 B1 * | 6/2005 | Swift et al. | 709/226 |

OTHER PUBLICATIONS

Service Level Agreements—An emerging Trend in the Internet Services Market, Agilent Technologies, 1999, pp. 1-10.*

(Continued)

*Primary Examiner*—Asad M Nawaz
*Assistant Examiner*—Benjamin Ailes
(74) *Attorney, Agent, or Firm*—Marcia L. Doubet (57) ABSTRACT

A service level agreement between a network service provider and a network user may require that specified service metrics or parameters be maintained within predetermined limits. To reduce the chance those limits (and the service level agreement) will be violated, the service metric is sampled periodically over successive sampling intervals. The mean value and the standard deviation of the set of samples obtained during the most recent sampling interval are used to screen out unreliable data. If the set of samples satisfies the reliability screening, the set is used in combination with past acceptable sets to determine the trend in the sampled service metric. If the trend is toward a violation, the time of the violation is predicted based on the assumption the current trend will continue. If the predicted time of violation is sufficiently near the current time, an alert is sent to the service provider to permit the service provider to initiate anticipatory corrective action.

5 Claims, 6 Drawing Sheets

OTHER PUBLICATIONS

Analizing Stability in Wide-Area Network Performance, Balakrishnan, H., et. al., SIGMETRICS '97, Seattle, ACM 0-89791-909-2/97, p. 2-12.*

An Evaluation of Linear Models for Host Load Prediction, Dinda. P., et. al., IEEE 0-7803-5626-5, 1999, p. 87-96.*

Proceedings, Forth IEEE Real-Time Technology and Applications Sysposium (Cat. No. 98TB100245), pp. 121-130, Publisher IEEE Comput. Soc, Los Almitos, CA, USA Publication Date; 1998-Country, USA.

Proceedings IEEE International Symposium on Computers and Communications (Cat. No. PR00250) pp. 149-155, Publisher IEEE Comput. Soc, Los Alamitos, CA, USA Publication Date, 1999, Country, USA.

Journal; Multimedia Systems vol., No. 5 pp. 299-315, Publisher; Springer-Veriag, Publication date; Sep. 1998, Country, Germany.

* cited by examiner

METHOD, SYSTEM AND PROGRAM PRODUCT FOR MANAGING NETWORK PERFORMANCE

FIELD OF THE INVENTION

The present invention relates to management of network services and more particularly to a method, system and program product for managing network performance by supporting generation of reliable, anticipatory alerts of potential performance violations.

BACKGROUND OF THE INVENTION

When any computer network is put into service, the network operator and the network users have their own expectations as to the level of performance to be provided by the network. Where the network operator and the network users work for the same organization, the expectations may be formalized in written memoranda or may exist only in the minds of the network users and (hopefully) the network operator.

Where the network operator and the network users work for different organizations, the expectations may be formalized in a service level agreement. A service level agreement or SLA is an agreement or contract between a service provider, the network operator, and a customer, the network user. Under a service level agreement, the customer pays a service fee in return for an assurance that it will receive network service that conforms to requirements defined by the service level agreement. If the service provider then fails to provide the agreed-to service, it ordinarily becomes subject to penalties under the agreement, such as being required to rebate at least some previously received service fees or being required to reduce fees due for future services.

While an almost infinite variety of service level agreements, both technical and non-technical in nature, are possible, the present invention generally relates to the management of network performance where performance requirements have been defined, either informally or in formal service level agreements.

Network performance requirements, whether formal or informal, should reflect the type of network service being provided and the customer's specific requirements when it uses that service. A customer with high reliability requirements may, for example, expect or even obligate the service provider to keep the network in operation for no less than a specified percentage of time. Similarly, a customer for whom network response time is critical may expect or obligate the service provider to maintain average network transit times on critical routes at or below a defined threshold.

To verify that transit time requirements are being met, the service provider can regularly have a source network station "ping" (query) a destination network station to determine round trip transit time; that is, how long it takes for the query to reach the destination and for an acknowledgment to be returned from the destination to the source.

The actual performance of the system is usually monitored by a network management application which generates a message or alert when a performance violation occurs. That alert is sent at least to the service provider to enable the service provider to take steps to restore conforming network operation. This approach, while common, has significant drawbacks for both the network user and the service provider. From the network user's perspective, the performance violation may have already caused disruptions of significant tasks or processes by the time the network user first learns of it. Even if the service provider responds promptly to a violation alert, the recovery time or time required to return to conforming network operation is necessarily prolonged since the service provider can't begin to fix a problem until the problem is known to exist. From the service provider's perspective, the service provider may already be subject to penalties under an existing service level agreement by the time it first learns of the penalty-inducing violation. Even where no formal service level agreement exists, the service provider can expect to lose customer good will for having failed to live up to the customer's expectations.

SUMMARY OF THE INVENTION

The present invention may be implemented as a method, system or program product which supports the reliable prediction of network performance violations so that a service provider receives advance warning of an impending violation and can take steps to avoid the predicted violation.

The invention can be implemented as a computer-implemented method of managing network performance where performance requirements have been established. The provided service is monitored on a recurring basis to obtain samples of actual values of a performance-defining metric. A trend in actual service is established based upon the obtained samples. Once the trend is established, the time at which the provided service will cease to meet the established performance requirements if the trend continues can be determined.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 5, consisting of FIGS. 5*a* and 5*b*, taken together, is a flowchart of essential steps performed by a method implementing the present invention;

DETAILED DESCRIPTION

Figure 1:
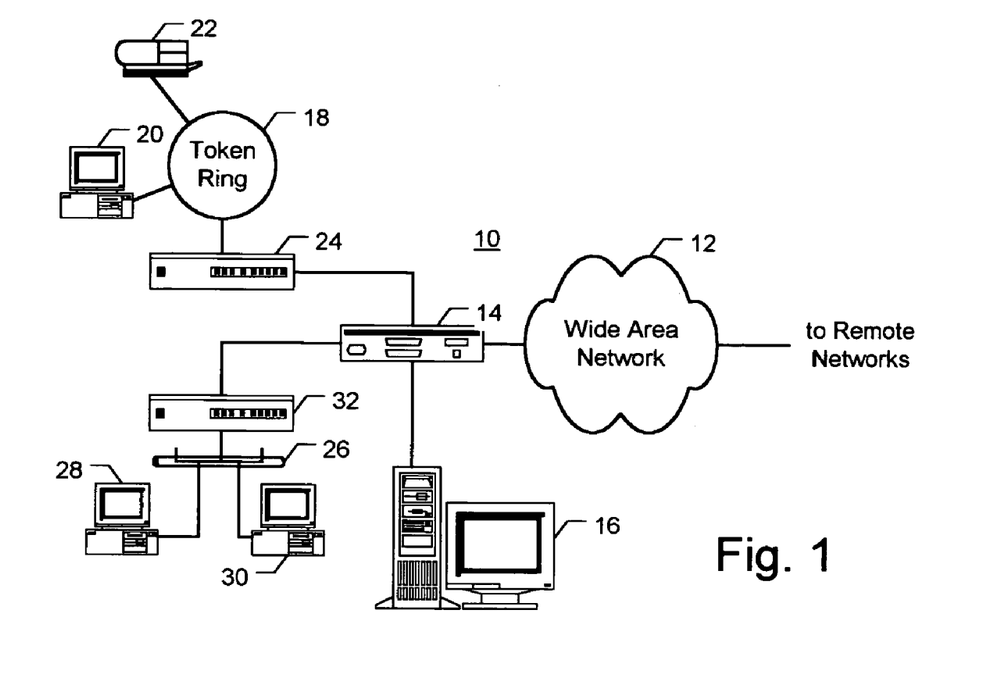
FIG. 1 is a schematic representation of a network environment in which the present invention may be implemented.

Referring to FIG. 1, the present invention is used in the administration of computer networks, one example of which is a network 10. The network 10 is represented as including a wide area network 12 which connects local networks to remote networks (not shown). The interface between the local networks and the wide area network 12 is provided through a gateway device 14 having an attached network management workstation 16. The illustrated local networks include both a token ring local area network (LAN) 18 and an ethernet LAN 26. Token ring LAN is shown as having network stations 20 and 22 and a bridge 24 to the gateway device 14. Ethernet LAN 26 is shown as including network stations 28 and 30 and a bridge 32 to the gateway device 14.

The types of networks and network devices shown in the drawing are intended as examples of a suitable environment for the present invention. The invention can be used in virtually any multi-node network where a performance metric is measurable. The invention should in no way be considered to be limited to the illustrated environment.

Specific embodiments of the invention will be described below, but it should be kept in mind that the present invention can be implemented in several different forms, such as in special purpose hardware or in a combination of hardware and software. A typical combination of hardware and software is a general-purpose computer system using a computer program that, once loaded and executed, causes the system to carry out method steps which will be described below. The software may be pre-loaded into the general-purpose computer system or may be separately available as a computer program product which, when loaded into a computer system, causes the system to carry out the methods steps.

The term "computer program" in the present context means any expression, in any language, code, or notation, of a set of instructions intended to cause a system having information processing capability to perform a particular function either directly or after conversion to another language and/or reproduction in a different material form.

Figure 2:
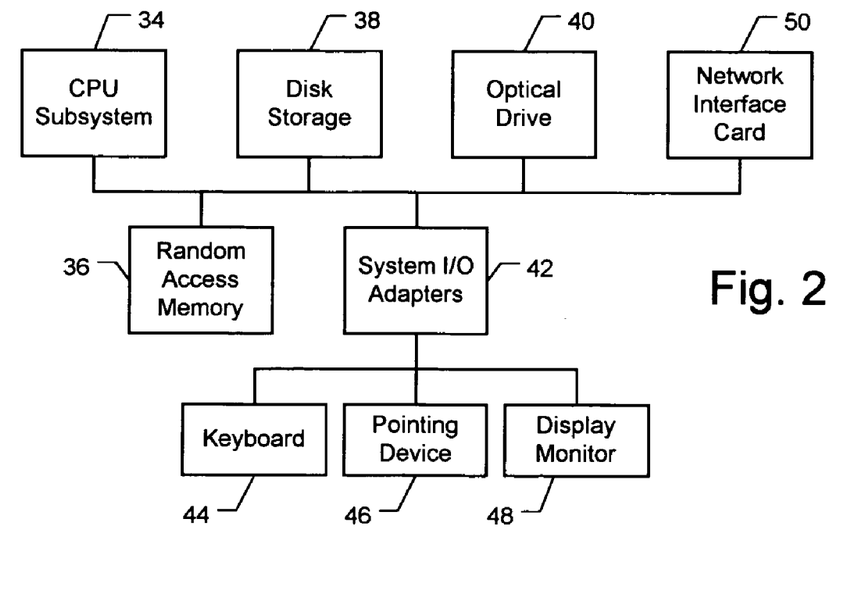
FIG. 2 is a block diagram of essential components of a network management station in which the invention may be performed.

FIG. 2 illustrates the major physical components of a general-purpose computer system capable, when programmed properly, of implementing the present invention. The computer system includes a central processing unit (CPU) subsystem 34 with a processor and supporting registers, caches and logic circuits. The computer system further includes random access memory 36, hard drive 38 and an optical drive 40, such as a CD/R, CD/RW or DVD drive. Where the invention is implemented as a program product, it is typically made available to the network operator initially on removeable magnetic or optical media for installation onto hard drive 38. Once the initial installation is complete, the program can be transferred into random access memory 36 as needed from hard drive 38. Alternatively, the program may be loaded into random access memory 36 directly from an optical media mounted in optical drive 40. The computer system further includes system input/output (I/O) adapters 42 supporting connections to standard system components such as a keyboard 44, a pointing device 46 and a display monitor 48. Finally, the computer system includes a network interface card 50 which provides the needed interface to the rest of the network.

Figure 3:
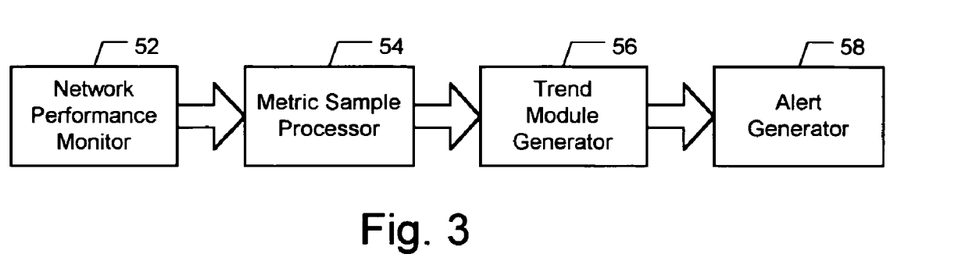
FIG. 3 is a functional flow diagram depicting major operations which take place when the invention is used.

FIG. 3 is a functional flow diagram illustrating major functions that are performed by a computer system programmed in accordance with the present invention. Among other tasks, the computer system functions as a network performance monitor 52 by making and/or receiving measurements reflecting actual network performance over time. The performance measurements constitute samples which are processed by a service metric sample processor function 54 to convert those samples to a metric (such as an average value) which reflects current network performance. For the sake of simplicity, the following discussion assumes that a single type of metric (average ping time) is monitored. In some situations, it may be desirable to monitor more than one type metric so that appropriate actions can be taken where any one of the metrics exceeds an allowable value.

Where successive values for a defined metric have been gathered, those values can be processed in a trend module generator 56 to determine whether there is a recognizable trend in the metric values over time. Where a metric is trending toward an unacceptable value, an alert generator function 58 can generate and send an anticipatory alert to the service provider in advance of an actual violation. The anticipatory alert gives the service provider time to take steps which will head off an actual violation of defined performance requirements.

Figure 4:
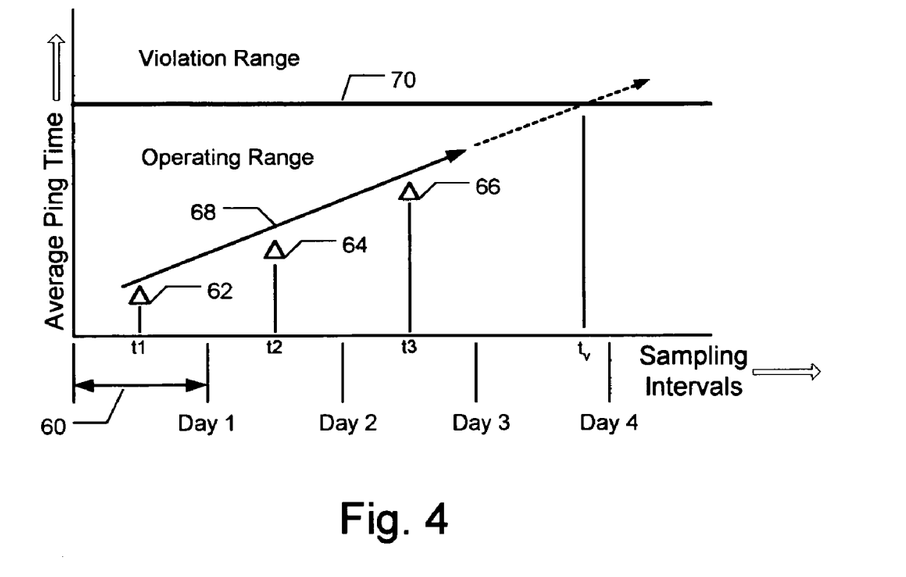
FIG. 4 is a plot of performance metrics over several sampling intervals.

FIG. 4 is a plot of a specific service metric over several sampling intervals. The specific service metric is ping time on a particular route between a first network station and a second network station; i.e., the time required for the first station to send a ping or query to the second station and to receive a response from the second station. Typically, the first station, which may be a network management station, is required to perform a minimum number of ping tests over a standard sampling interval 60 which, for purposes of this description, is assumed to be a 24-hour day. The actual or raw samples gathered over the course of each sampling interval can be processed to obtain an average ping value representing the average network performance over the entire day. Object 62 represents the average ping value over a first sampling interval 60. As a matter of convention, object 62 is shown as occurring at the midpoint of the interval even though its value can't be determined until the interval has ended. To establish a trend in actual network performance, ping times are taken throughout the day and are averaged to establish the actual network performance for that day. Objects 64 and 66 represent the ping time averages for the second and third sampling intervals on the plot.

A trend in actual network performance is established by using two or more of the average ping time values and known linear regression techniques to derive a curve or line 68 representing the trend. Depending upon the service metric chosen and the network performance requirements, the trend-indicating line can be a simple straight line established using two acceptable metric averages or a curved line fitted using several successive acceptable metric averages. Assuming a straight line 68 adequately describes the trend, the slope (positive or negative) of that line indicates whether the actual network performance over time is trending toward or away from a limit 70 of acceptable network performance (maximum allowable average ping time).

A simple approach to network management would be to wait for the average ping time to exceed limit 70 before generating any sort of alert to the system provider. The present invention uses a better approach. The slope of the trend-indicating line can be calculated using two acceptable ping time averages. Once the slope of the trend-indicating line and at least one average ping time value is known, straightforward mathematic calculations can be used to predict the time $t_v$ at which the average ping time will exceed the limit 70 if the trend continues unchanged.

In accordance with a preferred embodiment, an alert is not sent simply because a trend toward unacceptable ping times is established. For an alert to be of interest to a system provider, it must be reasonably imminent. A system provider is not likely to want to respond to a prediction of unacceptable ping times far in the future given the possibility that the trend toward unacceptable ping times might level off or be reversed in the course of normal system operation. For that reason, an alert is generated and sent to the system provider only where the predicted violation time $t_v$ falls within a time window (for example, two days) beginning at the current time. If $t_v$ is predicted as occurring outside of the time window, no alert is generated.

Even where an alert has been generated and sent to the service provider, the possibility still exists that the trend toward increasing ping time averages will level off or reverse itself in the course of normal system operation. In accordance with one feature of the invention, network performance (represented by average ping time) continues to be monitored even after an alert is generated. If the trend resulting in a pending alert is found to have changed substantially, a pending alert may be canceled.

For the described process to work reliably, the data used in the process must be reliable. In any process which relies on sampling of actual values, there is always the possibility that abnormal system conditions will result in abnormal sample values during any given sampling interval. To eliminate unreliable sets of samples, the present invention imposes reliability tests for each set of samples used in establishing a performance trend. If the reliability tests, described below, are not satisfied for a particular set of samples, the set is ignored, at least for trend determination purposes. The set of samples may be retained in the system for other purposes beyond the scope of this invention.

A first and seminal reliability test is that the number n of samples obtained over a sampling interval must exceed a predetermined minimum. Conventionally, it is assumed that at least thirty measurements or samples of a particular metric are needed to support reliable statistical analyses. If, during a particular sampling interval, less than thirty samples are obtained, no attempt is made to establish a performance trend using the sample set.

Assuming the necessary minimum number of samples have been obtained over the sampling interval, a second reliability test uses standard statistical techniques to derive the statistical mean and the statistical standard deviation of the set of samples under consideration. For a set of n samples, each having an individual raw value $y_i$, the statistical mean is simply the average of the values; that is $$y_{mean} = \frac{\sum y_i}{n}$$

For the same set of samples, the standard deviation s can be computed as $$s = \sqrt{\frac{n\sum (y_i)^2 - (\sum y_i)^2}{n(n-1)}}$$

To determine whether a particular set of samples are reliable, the mean value $y_{mean}$ and the standard deviation s of the set are used to generate a Confidence Percentage value CP where $$CP = \frac{y_{mean}}{s}$$

A set of samples is considered reliable (and thus suitable for use in the described process) if CP does not exceed a predetermined percentage threshold, preferably on the order of 25%. If CP exceeds the predetermined threshold, no effort is made to determine a performance trend based on the "unreliable" set of samples.

Where a set of samples gathered during a particular sampling interval is not to be used as failing to meet reliability tests, acceptable samples gathered during preceding and following sampling intervals can still be used to establish the trend in network performance.

Figure 5A:
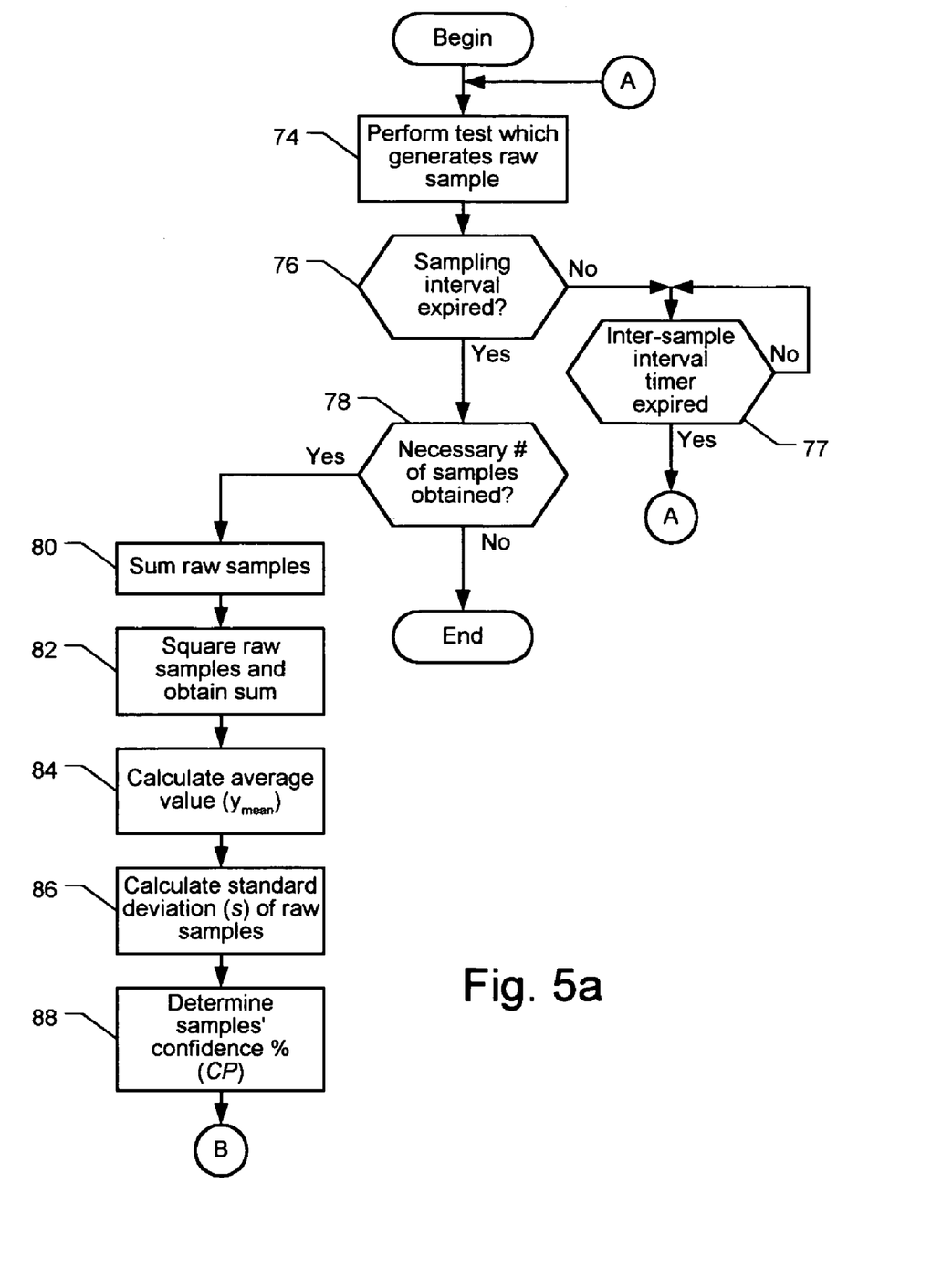
Figure 5B:
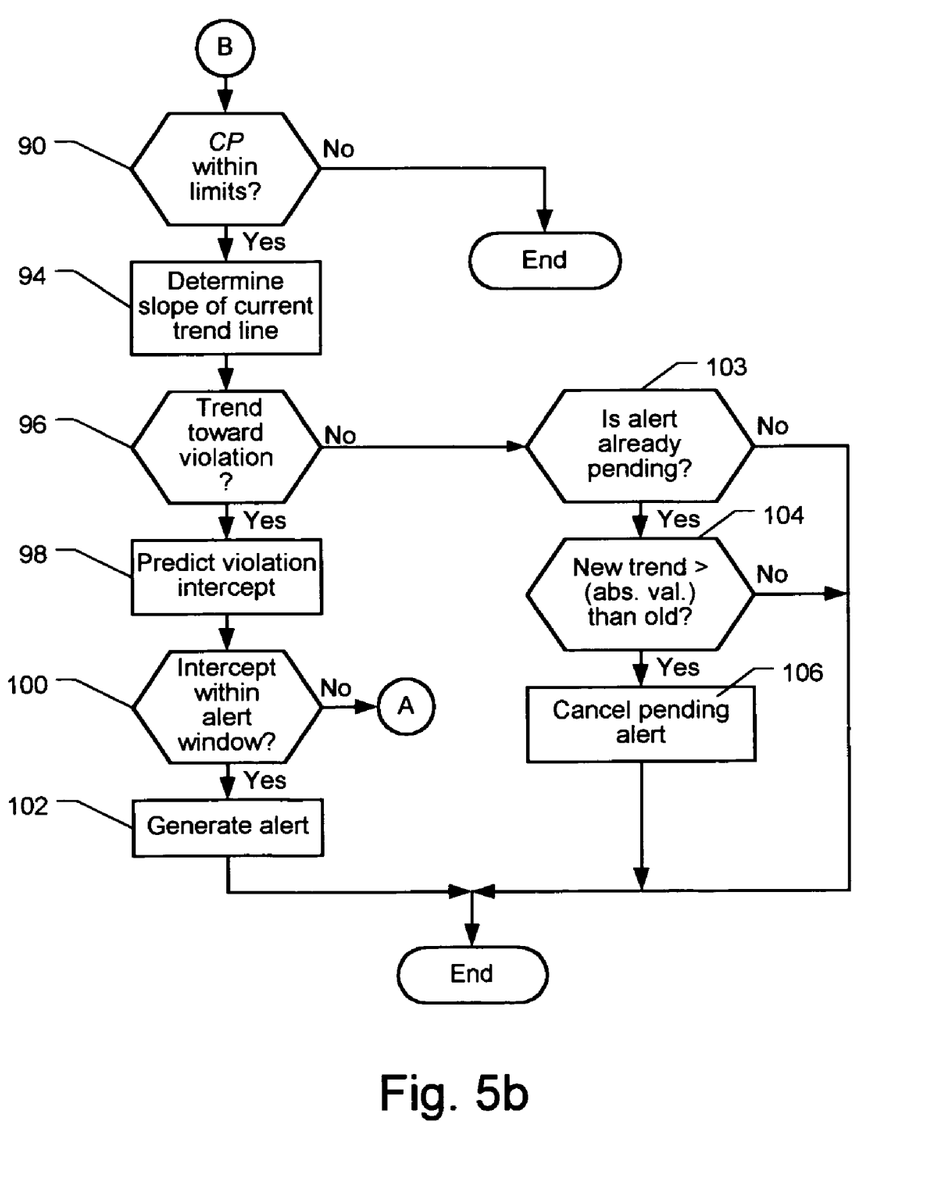

FIG. 5 is a flowchart of method steps that are performed in implementing the present invention. The initial step 74 is to perform a system test which generates raw sample values. The ping response time test described above is just one example of many types of system tests which might be performed to obtain a measure of actual network performance. Each test 74 is followed by a time check 76 which determines whether the current sampling interval has just ended or expired. If the sampling interval has not expired, a second time check 77 is made to determine whether an inter-sample interval timer has expired.

The inter-sample interval timer is used to limit the number of samples acquired during a given sampling interval since every test operation performed to acquire a sample represents network overhead and necessarily impacts network throughput. As noted earlier, good statistical practice requires a minimum of thirty samples for statistically reliable averaging. Therefore, it can be expected that the inter-sample interval timer will have a short enough timeout period to guarantee that at least thirty samples will be obtained over the course of the sampling interval. The maximum number of samples to be obtained may vary with the type of system test being performed. For ping time tests, it is believed that a maximum of 130-150 samples per twentyfour hour sampling interval is appropriate.

When the sampling interval does expire, the number of samples obtained during the interval is compared to a minimum threshold number in operation 78. If the number of samples falls below the minimum threshold, no effort is made to continue the trend determination process and the current process cycle is ended. Even though the current process cycle ends, a new sampling cycle is already underway for the new sampling interval that has just begun.

Assuming an adequate number of samples is obtained for the current cycle, the raw samples are summed in step 80. In a following step 82, each raw sample in the set is squared and the squared values are summed. The average or mean value for the set is obtained in step 84 while the standard deviation for the set is calculated in step 86.

As described earlier, the set of samples may or may not be used depending on the confidence percentage CP for the set; that is, the ratio of the set's standard deviation to its mean or average value. The CP value is calculated in step 88 using the earlier-described equation and then compared to a predetermined threshold percentage in step 90 to determine whether the set's CP value falls within acceptable limits. If the set's CP value falls outside the acceptable limits, the trend determination process is ended without using the "unreliable" set of samples.

Assuming the set of samples under consideration satisfies the defined reliability tests, the averages or mean values for the current set and an earlier set of samples are used in an operation 94 to determine whether there is a trend in average ping response times. The trend is characterized by the slope of a line passing through the two time displaced mean values. The slope is tested in step 96 to determine whether the average ping response times are approaching a violation threshold. If step 96 shows that the trend is toward violation, the current slope of the line, one of the average ping response times at an endpoint of the line and the violation threshold are used to predict (step 98) when the average ping response time will exceed the threshold assuming the current trend continues unchanged.

This predicted time-until-violation value can be determined by solving the equation $y=mx+b$ for the value of $x$ where y=the maximum acceptable (violation threshold) average ping time, m=the computed slope of the trend line during the last sampling interval, b=the current average ping time, and x=the time-until-violation as measured from the current time.

The variables y, m and b are known, making it a simple matter to determine x. Once the predicted violation time is established, it can be checked in an operation 100 against the limits of a time window (for example, a time window that begins at the current time and ends 48 hours later). If the predicted time of violation falls outside the time window, the current process cycle is ended with no action being taken other than to preserve the values calculated using the current set of samples. However, if the predicted time of violation falls within the time window, an alert is generated in step 102 and sent to the network manager.

If step 96 does not indicate that the current trend is toward the violation threshold, meaning the trend is either flat or away from the violation threshold, then a check 103 is made as to whether a previously generated alert is still pending. If there is no pending alert, no further computations are performed and the current process cycle is ended.

If a previously generated alert is still pending, the absolute value of the slope of the current trend line is compared to the absolute value of the slope of the preceding trend line in an operation 104. Unless the absolute value of the new slope is greater than the absolute value of the preceding slope while the sign of the new slope is negative, the trend toward an eventual violation necessarily continues. The samples and the metric average are retained. The previously-generated alert is not affected. The current process cycle is ended to allow the next iteration of the process to continue.

Figure 6:
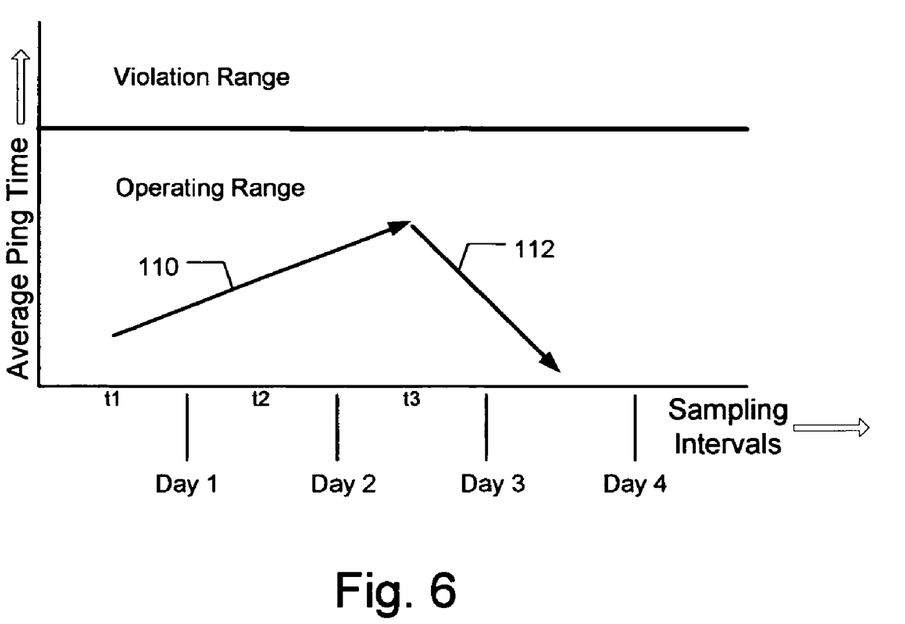
FIG. 6 is a plot of conditions under which a pending alert can be canceled for certain successive network performance trends.

If, however, the absolute value of the new slope is greater than the absolute value of the old while their algebraic signs are different, a significant trend away from the violation threshold is necessarily indicated. This can most clearly be seen by reference to FIG. 6 where line 110 represents an old or prior trend line while line 112 represents the current trend line. While the slope of line 110 shows a trend toward violation, the slope of line 112 shows an even sharper trend away from violation. Referring back to FIG. 5, where a significant trend away from violation is found from the test 104, the previously-generated and still pending alert is canceled in step 106.

An alternative and less stringent test for determining when to cancel a previously generated alert is described below with reference to FIGS. 7 and 8. The alternative test is based on a premise that a pending alert issued as a result of a prior trend can safely be canceled if an alert would not be generated based on the current trend. Recall that an alert is generated in the process described above where a trend toward a violation threshold will cross that threshold within a predetermined time window if the trend continues unchanged. A time window of two days was assumed for purposes of illustration.

Figure 7:
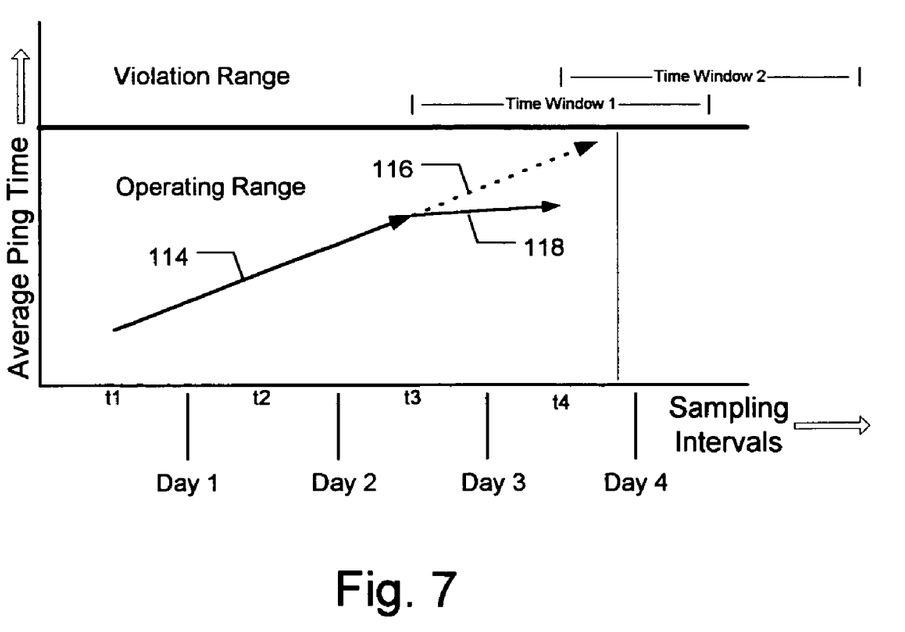
FIG. 7 is a plot of conditions under which a pending alert can be canceled according to an alternate embodiment of the invention.

Referring first to FIG. 7, which illustrates the premise of the alternative process, an alert is generated at time t3 because the trend characterized by line 114 would result in the violation threshold being exceeded within two days of time t3. However, for the current trend represented by line 118 (beginning at time t3 and ending at time t4), it can be seen that the lesser slope of the current trend would not, if continued, cause the trend to reach the violation threshold will not be exceeded within two days of time t4 even if the trend continues unchanged. Under the noted conditions, no alert would be issued at time t4. If an alert would not be issued at time t4 based on the then current trend, it would be illogical to allow a previously-generated alert to remain in force. If a determination is made that current conditions do not warrant generation of an alert at current time t4, then pending alerts based on past conditions are canceled.

Figure 8:
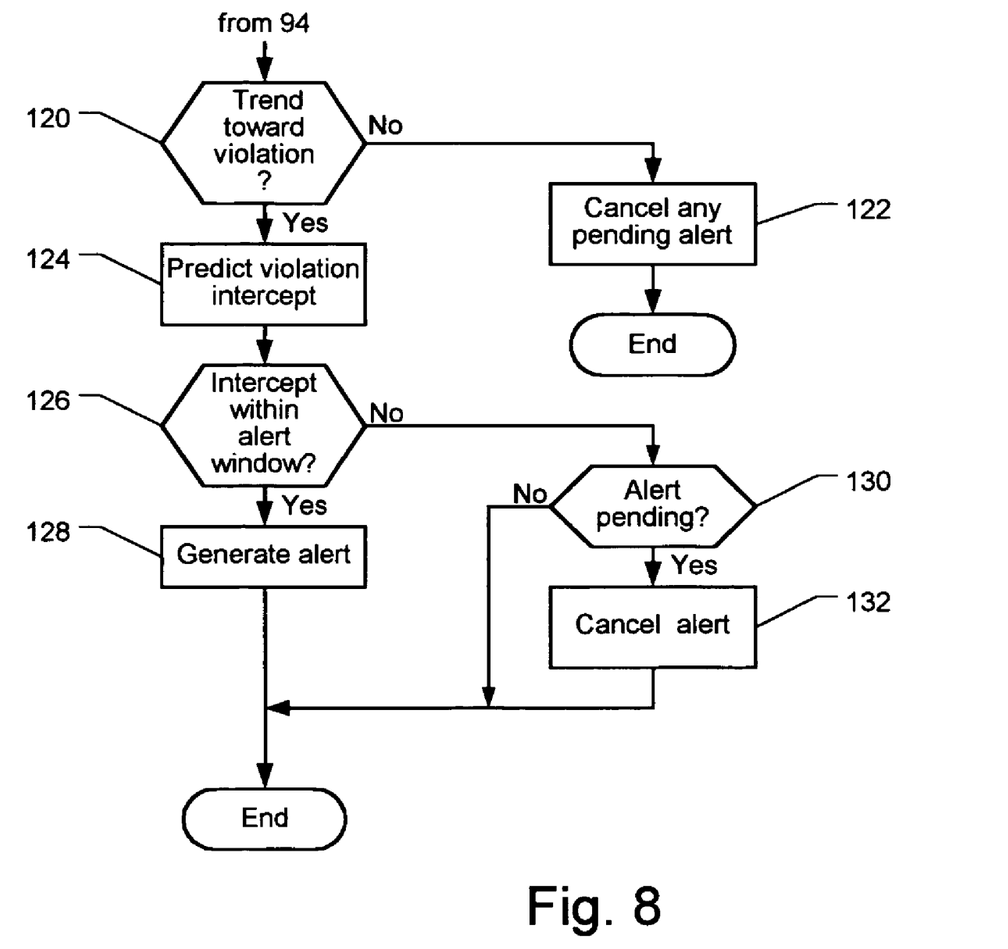
FIG. 8 is a partial flow chart showing method steps that are performed in implementing the alternate embodiment of the invention.

FIG. 8 is a flow chart of the method steps required to carry out the alternative process steps noted above. The method steps previously described with reference to FIG. 5 remain unchanged from the beginning of that Figure through the output from operation 94, which is the slope of the current trend line. In the alternative process, the determined slope is used as an input to a step 120 which determines whether the current trend is toward violation. If it isn't, any pending alerts are canceled. If the trend is found still to be toward violation, the time at which the trend will result in a violation is predicted in step 124. If the predicted time of violation falls is found to fall within the time window in step 126, then a new alert is generated in step 128. Previously-generated alerts (if any) are not canceled.

If, however, the test 126 indicates that the latest predicted time of violation falls outside the time window, which means that no alert is to be generated based on current conditions, test 130 looks for previously-generated and still pending alerts. If any such alert or alerts exist, they are canceled in step 132.

While there has been described what is believed to be a preferred embodiment of the invention, variations and modifications in the preferred embodiment will occur to those skilled in the art. Therefore, it is intended that the appended claims shall be construed to include the preferred embodiment and all variations and modifications as fall within the true spirit and scope of the invention.

What is claimed is:

1. A method of monitoring network performance where performance requirements are already established in order to generate anticipatory alerts, comprising:

monitoring, by a computer, a performance-defining metric on a recurring basis to obtain samples of the metric;

determining a trend in actual service based on the obtained samples of the metric using linear regression, further comprising:

analyzing a set of samples obtained over a predetermined sampling interval to determine whether the analyzed set satisfies predetermined reliability criteria, the predetermined reliability criteria requiring a predetermined, minimum number of samples in the set; and if the analyzed set of samples satisfies the predetermined reliability criteria, then using the set of samples in the linear regression, further comprising:

determining a standard deviation and a mean of the ones of the obtained sets of samples, determining a ratio of the standard deviation and the mean of the ones of the obtained sets of samples, generating a prediction, using the ones of the obtained sets of samples in which the ratio of the standard deviation and the mean does not exceed a predefined threshold, of a time at which the metric will cross a defined threshold if the current trend continues; and generating an anticipatory alert if the time at which the metric will cross the defined threshold is less than a predetermined time from a current time at which the prediction is made; and canceling a previously generated alert if a subsequently-generated mathematical representation of the current trend predicts that the time when the network performance metric will exceed the defined threshold is not within a predetermined time window measured from a current time at which the subsequent prediction is made.

2. A method for use in a system for providing an anticipatory alert wherein at least one network performance metric is required to comply with a defined threshold, comprising:

monitoring, by a computer, a provided service to obtain, on a recurring basis, sets of samples representing actual network performance;

using only the obtained sets of samples containing at least a predetermined minimum number of samples in a linear regression analysis to generate a mathematical representation of a current trend in the network performance, further comprising:

calculating predefined statistical parameters of each obtained set of samples, wherein the calculated predefined statistical parameters comprise a standard deviation and mean of the set of samples, determining whether the calculated predefined statistical parameters meet a predefined threshold requirement, and using, in the linear regression analysis, only the obtained sets of samples for which the calculated predefined statistical parameters are determined to meet the predefined threshold requirement;

using the mathematical representation, predicting a time when the network performance metric will exceed the defined threshold if the current trend continues;

generating the anticipatory alert if the predicted time is within a fixed time window measured from a current time at which the prediction is made; and canceling a previously generated alert if a subsequently-generated mathematical representation of the current trend predicts that the time when the network performance metric will exceed the defined threshold is not within the fixed time window measured from a current time at which the subsequent prediction is made.

3. The method as set forth in claim 2, wherein:

the predefined threshold requirement requires that the standard deviation be no greater than a predetermined percentage of the mean.

4. A system for providing an anticipatory alert indicating a predicted violation of a predetermined network performance requirement, the system comprising:

a memory;

a performance monitor which obtains sets of samples of a predefined service metric on a recurring basis;

a sample processor which receives the obtained sets of samples and generates a mathematical representation of a current trend in service metric values using ones of the obtained sets of samples that contain at least a predetermined, minimum number of samples, wherein the mathematical representation comprises a linear regression performed using the ones of the obtained sets of samples and the sample processor further comprises:

statistical logic for determining a standard deviation and a mean of the ones of the obtained sets of samples, arithmetic logic for determining a ratio of the standard deviation and the mean of the ones of the obtained sets of samples, and prediction logic for generating a prediction, using the ones of the obtained sets of samples in which the ratio of the standard deviation and the mean does not exceed a predefined threshold, of a time at which the service metric will cross a defined threshold if the current trend continues;

an alert generator for generating the anticipatory alert if the time at which the service metric will cross the defined threshold is less than a predetermined time from a current time at which the prediction is made; and a canceler for canceling a previously generated alert if a subsequently-generated mathematical representation of the current trend predicts that the time when the service metric will cross the defined threshold is not within the predetermined time measured from a current time at which the subsequent prediction is made.

5. An article of manufacture comprising a non-transitory computer useable storage medium having a computer readable program embodied therein, wherein the computer readable program when executed in a computer causes the computer to:

receive, on a recurring basis, sets of samples of a service metric obtained by monitoring performance of a network;

calculate predefined statistical parameters of the sets of obtained samples;

determine whether the calculated predefined statistical parameters meet predefined threshold requirements, wherein the predefined threshold requirements include requiring a minimum number of samples for each obtained set and a ratio of the calculated predefined statistical parameters that does not exceed a predetermined ratio;

use ones of the sets of samples which meet the predefined threshold requirements to generate a mathematical representation of a current trend in the service metric using linear regression, the linear regression further comprising:

determining a standard deviation and a mean of the ones of the obtained sets of samples, and determining a ratio of the standard deviation and the mean of the ones of the obtained sets of samples;

use the mathematical representation to predict a time when the service metric will exceed a defined threshold if the current trend continues;

generate an anticipatory alert if the predicted time is less than a predefined time from a time at which the prediction is made; and cancel a previously generated alert is a subsequently-generated mathematical representation of the current trend predicts that the time when the service metric will exceed the defined threshold is not within the predefined time from a time at which the subsequent prediction is made.

\* \* \* \* \*